United States Patent [19]

Yanagishima et al.

[11] 4,119,172
[45] Oct. 10, 1978

[54] STEERING FORCE CONTROL SYSTEM

[75] Inventors: Takayuki Yanagishima, Yokosuka; Naohiko Inoue, Yokohama, both of Japan

[73] Assignee: Nissan Motor Company, Ltd., Japan

[21] Appl. No.: 768,827

[22] Filed: Feb. 15, 1977

[30] Foreign Application Priority Data

Feb. 17, 1976 [JP] Japan .................................. 51-15510

[51] Int. Cl.² .............................................. B62D 5/08
[52] U.S. Cl. ........................................ 180/141; 60/434; 180/142
[58] Field of Search ................ 180/143, 141, 132, 142; 90/434, 370

[56] References Cited

U.S. PATENT DOCUMENTS

| 3,693,747 | 9/1972 | Nishikawa | 180/143 |
| 3,994,361 | 11/1976 | Nishikawa | 180/143 |

Primary Examiner—John A. Pekar

[57] ABSTRACT

A pressure regulating valve varies an input fluid pressure from a pump to a steering pressure either stepwise or continuously varied in accordance with the vehicle speed and, when a power cylinder control valve alternatively admits the steering pressure into two working chambers of a power cylinder, a reaction chamber control valve alternatively admits the input fluid pressure into only a reaction force chamber of the power cylinder control valve, corresponding to the working chamber fed with the steering pressure, to produce in the reaction force chamber a reaction force increased with increases in the vehicle speed.

12 Claims, 6 Drawing Figures

STEERING FORCE CONTROL SYSTEM

BACKGROUND OF THE INVENTION

1. Field of the Invention

The present invention relates generally to a steering force control system, for a power steering system of a vehicle, which includes two reaction force chambers and provides a steering force controlled in accordance with the speed of the vehicle and particularly to a steering force control system in which an inlet fluid pressure from a pump is regulated to a steering pressure either stepwise or continuously varied in accordance with the vehicle speed provides a reaction force for a control valve moved for admitting the steering pressure into one fluid chamber of a power cylinder and draining the other fluid chamber of the power cylinder which force is increased with increases in the vehicle speed.

2. Description of the Prior Art

As is well known in the art, when a power steering system for a vehicle is a so-called integral type which is mechanically connected to a load through a torsion bar at all times, a steering force can be increased in accordance with increases in the speed of the vehicle by, for example, reducing the quantity of pressurized hydraulic fluid discharged from a pump or by controlling a steering pressure by a relief valve. However, when a power steering system for a vehicle is a linkage type which includes a reaction force mechanism, since a reaction force is produced by a steering pressure, simply reducing the steering pressure has been attended with inconveniences that a steering pressure for a power cylinder and the reaction force are reduced. Furthermore, when a power steering system is a linkage type which includes one reaction force chamber, a steering force can be controlled by controlling the pressure of hydraulic fluid in the reaction force chamber in accordance with the vehicle speed. However, when a power steering system is a linkage type which includes two reaction force chambers, a steering force has been unable to be controlled in accordance with the vehicle speed. In this instance, it is necessary to control the pressure of hydraulic fluid in the reaction force chambers in accordance with both the vehicle speed and the steering operations.

SUMMARY OF THE INVENTION

It is, therefore, an object of the invention to provide a steering force control system in which a steering force is controlled by controlling the pressure of hydraulic fluid in two reaction force chambers in accordance with the speed of a vehicle without reducing the performance of a power steering system and in accordance with the steering operations.

The object is accomplished by a steering force control valve for regulating an input fluid pressure from a pump to an output fluid pressure or steering pressure either stepwise or continuously varied in accordance with the vehicle speed, a power cylinder control valve feeding the steering pressure into one of fluid chambers of a power cylinder and returning hydraulic fluid from the other fluid chamber of the power cylinder into a drain line in accordance with the steering operations and having two reaction force chambers for urging the control valve into a neutral position, and a reaction force chamber control valve for feeding the input fluid pressure from the pump into one of the reaction force chambers and discharging hydraulic fluid from the other reaction force chamber into a drain line in accordance with the steering operations.

BRIEF DESCRIPTION OF THE DRAWINGS

This and other features and advantages of the invention will become more apparent from the following detailed description taken in connection with the accompanying drawings in which.

DETAILED DESCRIPTION OF THE PREFERRED EMBODIMENTS

Figure 1:
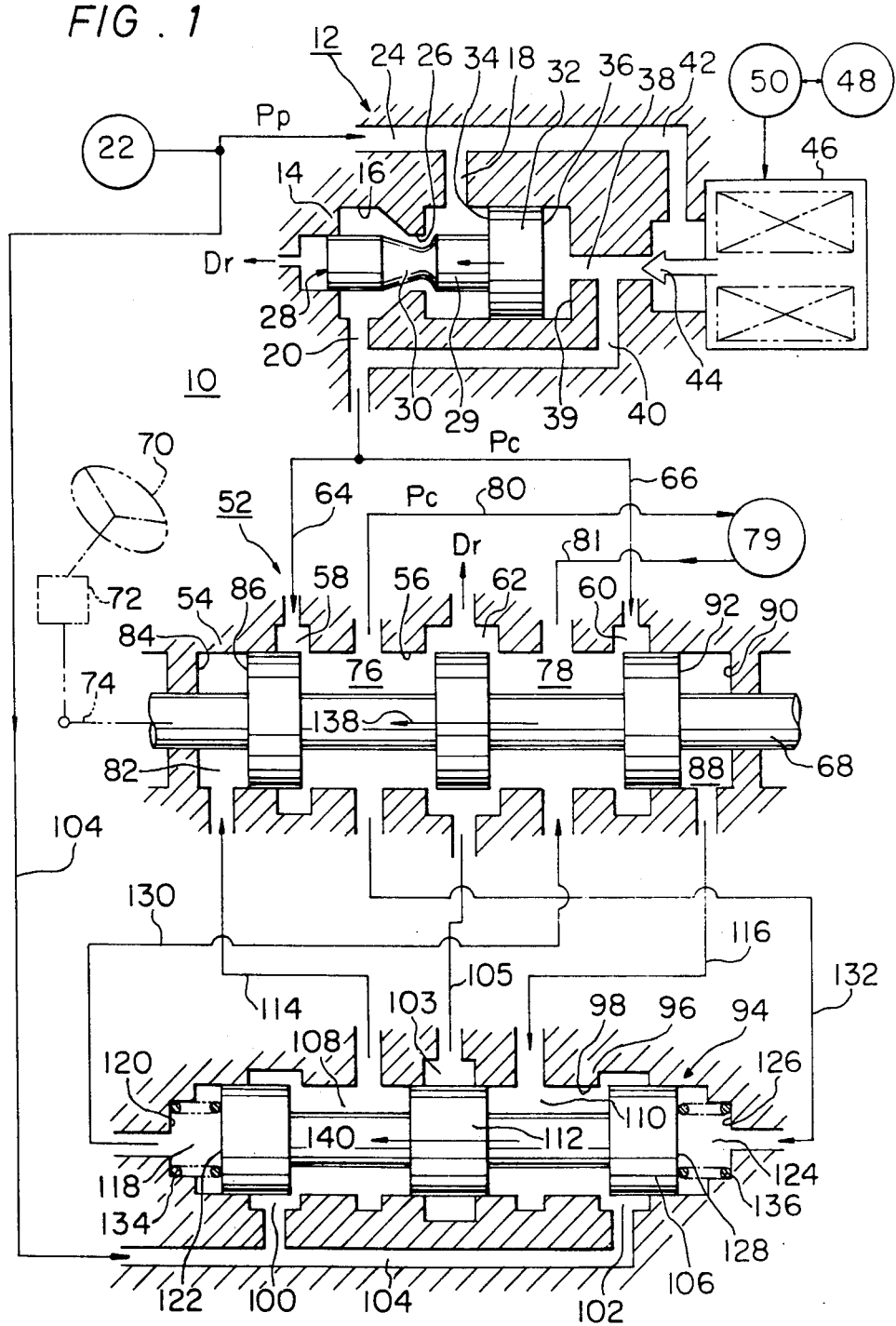
FIG. 1 is a schematic view of a first preferred embodiment of a steering force control system according to the invention.

Referring to FIG. 1 of the drawings, there is shown a steering force control system according to the invention for a power steering system of a motor vehicle (not shown). The steering force control system, generally designated by the reference numeral 10, comprises a steering pressure control valve 12 for regulating an input fluid pressure from a pump to an output fluid pressure or a steering assistant fluid pressure which is varied in accordance with the speed of the vehicle. The steering assistant fluid pressure will be hereinafter referred to as "the steering pressure" for purpose of brevity. The steering pressure control valve 12 comprises a valve housing 14 having a valve chamber 16 therein. The valve housing 14 has a first inlet port or passage 18 and an outlet port or passage 20 each of which opens into the valve chamber 16. The inlet port 18 communicates with a pressurized hydraulic fluid source or pump 22 through a passage 24. The valve chamber 16 is formed therein with an orifice 26 forming a part of a passage providing communication between the inlet and outlet ports 18 and 20. A valve spool 28 is axially slidably located in the valve chamber 16 and extends through the orifice 26. The valve spool 28 has a portion 29 the cross sectional area of which is axially constant and is about equal to that of the orifice 26, and a portion 30 the cross sectional area of which is smaller than that of the orifice 26 and is axially continuously varied. The portion 29 is slidably fitted in the orifice 26 to close it, when it is located in the orifice 26. The portion 30 is normally located in and cooperates with the orifice 26 as shown in FIG. 1 so that the effective cross sectional area of the orifice 26 or the clearance between the orifice 26 and the portion 30 is varied by the portion 30 in accordance with axial movement of the valve spool 28, that is, the control valve 12 constitutes a variable orifice or a throttling valve. The valve spool 28 has a piston or land 32 fixedly secured thereto and slidably fitted in the valve chamber 16. The piston 32 has an annular land face or a step 34 communicating with the inlet port 18 and acted on by a fluid pressure in the inlet port 18, and a land face 36 forming an extreme end surface of the valve spool 28. The valve housing 14 also has a second inlet port or passage 38 opening into the valve chamber 16 defined between the end surface 36 of the piston 32 and an end wall 39 of the valve chamber 16. The end surface 36 of the piston 32 is acted on by a fluid pressure in the inlet port 38. The inlet port 38 communicates with the outlet port 20 through a passage 40 and with the passage 24 through a passage 42. A control valve 44 is provided for opening and closing the passage 42 to provide and block communication between the passage 42 and both the inlet port 38 and the passage 40 in accordance with the speed of the vehicle. The control valve 44 includes operating means which includes a solenoid 46 for electromagnetically operating the control valve 44 and a return spring (not shown). A sensor 48 is provided which senses the speed of the vehicle and generates an output signal representative of the sensed vehicle speed. A control circuit 50 is electrically connected to the sensor 48 for receiving the output signal therefrom. The control circuit 50 generates first and second output signals in response to first and second speeds of the vehicle lower and higher than a predetermined value, respectively. The solenoid 46 is electrically connected to the control circuit 50 for receiving the output signals therefrom and causes the control valve 44 to open and close the passage 42 in response to the first and second output signals of the control circuit 50, respectively.

The steering force control system 10 also comprises a power cylinder control valve 52 for causing a power cylinder to operate a steering link in response to the turning of a steering handle. The power cylinder control valve 52 comprises a valve housing 54 having a cavity 56 therein. The housing 54 is formed with first and second inlet ports 58 and 60 and a drain port 62 each opening into the cavity 56. The inlet ports 58 and 60 both communicate with both the outlet port 20 and the passage 40 of the steering pressure control valve 12 through passages 64 and 66, respectively. A valve spool 68 is axially slidably fitted in the cavity 56 and is operatively connected to a steering handle 70 and a steering gear box 72 through a linkage mechanism 74. The control valve 52 has first and second fluid chambers 76 and 78 in the cavity 56. The first fluid chamber 76 communicates at all times with one of fluid chambers (not shown) of a power cylinder 79 of the power steering system through a passage 80 and the second fluid chamber 78 communicates at all times with the other fluid chamber of the power cylinder 79 through a passage 81. When the control valve 52 is in a neutral or balance position shown in FIG. 1, the valve spool 68 concurrently provides communication between the first fluid chamber 76 and both the first inlet and drain ports 58 and 62 and between the second fluid chamber 78 and both the second inlet and drain ports 60 and 62. The control valve 52 has a first operative position in which the valve spool 68 separates the first fluid chamber 76 from the drain port 62 and communicates the chamber 76 with the first inlet port 58 only and separates the second fluid chamber 78 from the second inlet port 60 and communicates the chamber 78 with the drain port 62 only and a second operative position in which the valve spool 68 separates the first fluid chamber 76 from the first inlet port 58 and communicates the chamber 76 with the drain port 62 only and separates the second fluid chamber 78 from the drain port 62 and communicates the chamber 78 with the second inlet port 60 only. Each of the valve case 54 and the valve spool 68 is alternatively moved relatively to each other into the first and second operative positions in response to the steering operation of the steering handle 70 for turning road wheels (not shown) of the vehicle. The control valve 52 has a first reaction force chamber 82 defined between an end wall 84 of the cavity 56 and an end 86 of the valve spool 68 and a second reaction force chamber 88 defined between an end wall 90 of the cavity 56 and an end 92 of the valve spool 68.

The steering force control system 10 also comprises a reaction force chamber control valve 94 for controlling communication between the reaction chambers 82 and 88 of the control valve 52 and the pressurized fluid source 22. The reaction chamber control valve 94 comprises a valve housing 96 having a cavity or valve chamber 98 therein. The valve housing 96 is formed with first and second inlet ports 100 and 102 and a drain port 103 each opening into the cavity 98. The inlet ports 100 and 102 both communicate with the pressurized fluid source 22 through a passage 104, while the drain port 103 communicates with the drain port 62 of the power cylinder control valve 52 through a passage 105. A valve spool 106 is axially slidably fitted in the cavity 98 and has in the cavity 98 first and second fluid chambers 108 and 110 separated from each other by a land 112 and communicating respectively with the first and second reaction chambers 82 and 88 through passages 114 and 116 at all times. When the control valve 94 is in a neutral or balance position shown in FIG. 1, the valve spool 106 concurrently communicates the first and second fluid chambers 108 and 110 with the first and second inlet ports 100 and 102, respectively and separates the chambers 108 and 110 from the drain port 103. An input fluid pressure $P_p$ fed into each of the reaction chambers 82 and 88 produces a reaction force which urges the control valve 52 into the neutral position. The control valve 94 has a third fluid chamber 118 defined between an end wall 120 of the cavity 98 and an end 122 of the valve spool 106 and a fourth fluid chamber 124 defined between an end wall 126 of the cavity 98 and an end 128 of the valve spool 106. The third and fourth fluid chambers 118 and 124 communicate respectively with the second and first fluid chambers 78 and 76 of the control valve 52 through passages 130 and 132 at all times. Springs 134 and 136 are provided to urge the valve spool 106 into the neutral position in opposite directions. The control valve 94 has a first operative position in which the valve spool 106 communicates the first and second fluid chambers 108 and 110 with the first inlet and drain ports 100 and 103, respectively and separates the second fluid chamber 110 from the second inlet port 102, and a second operative position in which the valve spool 106 communicates the first and second fluid chambers 108 and 110 with the drain and second inlet ports 103 and 102, respectively and separates the first fluid chamber 108 from the first inlet port 100. The control valve 94 is moved into the first and second operative positions by the steering pressures fed from the first and second fluid chambers 76 and 78 of the control valve 52 into the fourth and third fluid chambers 124 and 118 and acting on the ends 128 and 122 of the valve spool 106 in opposition to the forces of the springs 134 and 136 when the control valve 52 is in the first and second operative positions, respectively.

The steering force control system 10 thus described is operated as follows:

When the speed of the vehicle is above the predetermined value, the passage 42 is closed by the control valve 44 to obstruct communication between the passages 40 and 42. The output fluid pressure $P_c$ discharged from the outlet port 20 of the control valve 12 into the passage 40 acts on the end surface 36 of the piston 32 of the valve spool 28 from the inlet port 38 to urge the portion 29 toward the orifice 26 to reduce the effective cross sectional area of the orifice 26 or to be apt to close the orifice 26. When the area of the end surface 36 is represented by $S_a$, the force $F_1$ exerted on the end surface 36 is expressed as follows:

$$F_1 = P_c \times S_a \qquad (1)$$

The input fluid pressure $P_p$ fed from the pump 22 into the control valve 12 acts on the annular end surface 34 of the piston 32 to urge the portion 29 away from the orifice 26. When the area of the annular end surface 34 is represented by $S_b$, the force $F_2$ exerted on the end surface 34 is expressed as follows:

$$F_2 = P_p \times S_b \qquad (2)$$

The valve spool 28 throttles the orifice 26 so that the input fluid pressure $P_p$ is regulated to the output fluid pressure $P_C$ having a value in which the forces $F_1$ and $F_2$ are balanced with each other. Accordingly, the input fluid pressure $P_p$ is expressed as follows:

$$P_p = (S_a/S_b) \times P_c \qquad (3)$$

It is assumed that the valve spool 68 of the control valve 52 is moved into the first operative position, that is, leftwards as shown by the arrow 138 in FIG. 1 by the steering operation of a driver (not shown) of the vehicle through the steering mechanism 72.

The output fluid pressure or steering pressure $P_c$ is fed from the control valve 12 into the control valve 52 through the passage 64. The steering pressure $P_c$ is fed from the first fluid chamber 76 of the control valve 52 into one fluid chamber of the power cylinder 79 through the passage 80. A hydraulic fluid in the other fluid chamber of the power cylinder 79 is drained into the drain port 62 through the passage 81 and the second fluid chamber 78 of the control valve 52. The pressure of the hydraulic fluid from the power cylinder 79 is about equal to zero.

The steering pressure $P_c$ is also fed from the first fluid chamber 76 into the fourth fluid chamber 124 of the control valve 94 through the passage 132 and acts on the end 128 of the valve spool 106 to move it from the neutral position into the first operative position, that is, leftwards as shown by the arrow 140 in FIG. 1. When the area of the end 128 of the valve spool 106 is represented by $S_c$ and the force of the spring 136 is represented by $F_4$, the force $F_3$ exerted on the end 128 is expressed as follows:

$$F_3 = P_c \times S_c + F_4 \qquad (4)$$

When the speed of movement of the valve spool 106 is represented by V and the mass of the valve spool 106 is represented by m, the force $F_3$ is also expressed as follows:

$$F_3 = mV + F_4' \qquad (5)$$

where $F_4'$ is a resistance of the housing 96 to movement of the valve spool 106 such as a friction between the housing 96 and the valve spool 106 and the force of the spring 134. Accordingly, the lighter the mass of the valve spool 106 is, the quicker the valve spool 106 is moved in response to variations in the steering force $P_c$.

By the movement of the control valve 14 into the first operative position, the input fluid pressure $$P_p (= \frac{S_a}{S_b} \times P_c)$$

from the pump 22 is fed into the the first reaction chamber 82 of the control valve 52 through the passage 104, the first fluid chamber 108 of the control valve 94 and the passage 114 to exert a reaction force on the end 86 of the valve spool 68. A hydraulic fluid in the second reaction chamber 88 is drained into the drain port 103 of the control valve 94 through the passage 116 and the second fluid chamber 110. By representing the area of the end 86 as $S_d$, the reaction force $F_5$ generated in the reaction chamber 118 is expressed as follows:

$$F_5 = P_p \times S_d = \frac{S_a}{S_b} \times P_c \times S_d \qquad (6)$$

Accordingly, when the vehicle speed is above the predetermined value and the passage 42 is closed by the control valve 44, the driver of the vehicle receives or feels a steering force for effecting turning of the road wheels of the vehicle which force corresponds to the reaction force $$F_5 = \frac{S_a}{S_b} \times P_c \times S_d (\text{or } \frac{S_a}{S_b} \times P_c \times S_e).$$

In this instance, $S_e$ is the area of the end 92 of the valve spool 68.

When the speed of the vehicle is below the predetermined value, the control valve 44 opens the passage 42 to provide communication between the passages 40 and 42. At this state, the output fluid pressure or steering pressure $P_c$ is equal to the input fluid pressure $P_p$ from the pump 22, that is, $P_p = P_c$. Accordingly, in this instance, the reaction force $F_5'$ produced in the reaction chamber 82 or 88 is expressed as follows:

$$F_5' = P_p \times S_d = P_c \times S_d (\text{or } P_c \times S_e) \qquad (7)$$

As is apparent from the Equations (6) and (7), when the vehicle speed is high, the vehicle driver receives or obtains a steering force which is $S_a/S_b$ greater than that required when the vehicle speed is low in effecting right and left turning of the vehicle wheels.

Referring to FIGS. 2, 3, 4, 5 and 6 of the drawings, there are shown second, third, fourth, fifth and sixth preferred embodiments of a steering force control system according to the invention. In FIGS. 2 to 6, like components and parts are designated by the same reference numerals as those used in FIG. 1 and the illustration of some components and parts similar to those shown in FIG. 1 is omitted for purpose of simplicity.

Figure 2:
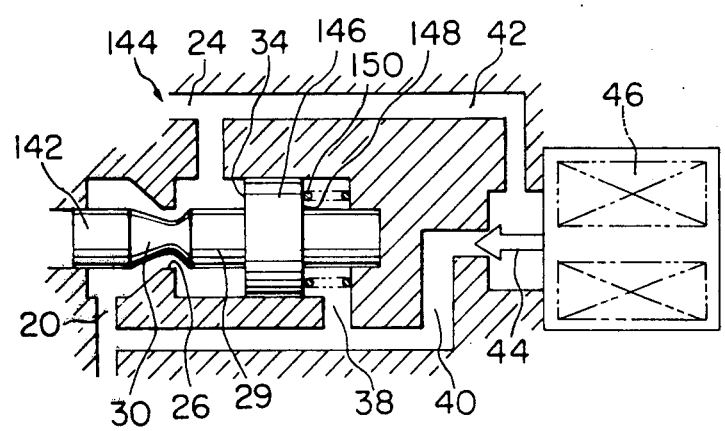
FIG. 2 is a schematic view of a second preferred embodiment of a steering force control system according to the invention.

The steering force control system shown in FIG. 2 is characterized in that a valve spool 142 of a steering pressure control valve 144 includes a piston 146 having an annular end 148 which has a surface area equal to that of the annular end 34 and is acted on by the output fluid pressure $P_c$ in the outlet port 38, and that a spring 150 is provided to urge the annular end 148 in cooperation with the output fluid pressure $P_c$. Accordingly, by representing the surface area of each of the annular ends 34 and 148 as S and the force of the spring 150 as $F_6$, the forces $F_1$ and $F_2$ acting respectively on the annular ends 148 and 34 are expressed as follows:

$$F_1 = P_c \times S + F_6 \qquad (8)$$

$$F_2 = P_p \times S \qquad (9)$$

Accordingly, the following Equation is obtained from the Equations (8) and (9).

$$P_p - P_c = F_6/S$$

Accordingly, although the steering pressure control valve 12 shown in FIG. 1 is a type in which the input fluid pressure $P_p$ is reduced to the output fluid pressure $P_c$ so that the ratio of $P_p$ to $P_c$ is constant as apparent from the Equation (3), the steering pressure control valve 144 shown in FIG. 2 is a type in which the input fluid pressure $P_p$ is reduced to the output fluid $P_c$ so that the difference between $P_p$ and $P_c$ is constant.

Figure 3:
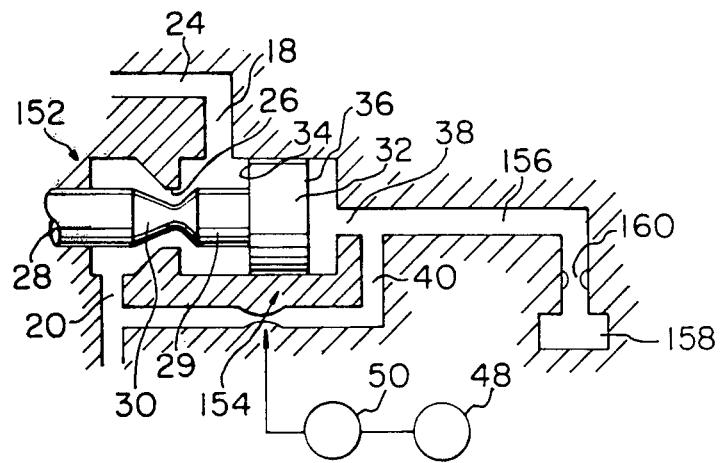
FIG. 3 is a schematic view of a third preferred embodiment of a steering force control system according to the invention.

The steering force control system shown in FIG. 3 is characterized in that a steering pressure control valve 152 comprises, in addition to the first variable orifice 26 controlled by the valve spool 28, a second variable orifice 154 for continuously reducing the output fluid pressure $P_c$ in accordance with increases in the speed of the vehicle, in lieu of providing the passage 42 and the control valve 44 and stepwise reducing the output fluid pressure $P_c$ in accordance with increases in the vehicle speed as the steering pressure control valve 12 shown in FIG. 1. The variable orifice 154 is provided in the passage 40 and the effective cross sectional area of the variable orifice 154 is continuously increased with increases in the vehicle speed by a control valve (not shown) controlled by the sensor 48 and the electric control circuit 50 or by a needle valve (not shown) operated by a factor representative of a function of the vehicle speed. A passage 156 is provided which communicates on the one hand with both the second inlet port 38 and the passage 40 and on the other hand with a drain 158 and is formed therein with an orifice 160. In this embodiment, the Equation (6) is applied and the output fluid pressure $P_c$ is continuously reduced with increases in the vehicle speed. Accordingly, the steering force is continuously increased with increases in the vehicle speed.

Figure 4:
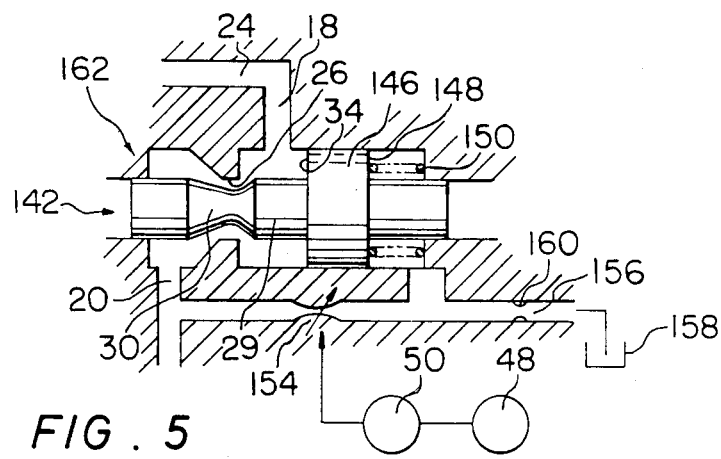
FIG. 4 is a schematic view of a fourth preferred embodiment of a steering force control system according to the invention.

The steering force control system shown in FIG. 4 is characterized in that a steering pressure control valve 162 comprises the valve spool 142 including the piston 146 having the opposite annular ends 34 and 148 having the surface areas equal to each other and the spring 150 as the steering force control system shown in and described with reference to FIG. 2, and the second variable orifice 154 and the passage 156 of the steering force control system shown in and described with reference to FIG. 3.

Figure 5:
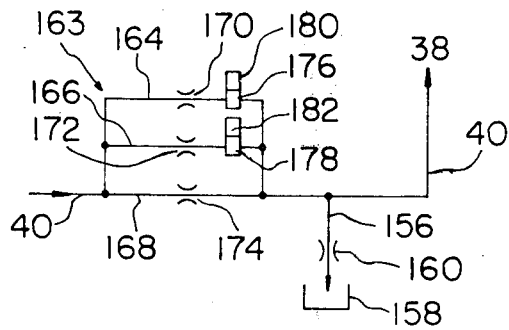
FIG. 5 is a schematic view of a fifth preferred embodiment of a steering force control system according to the invention.

The steering force control system shown in FIG. 5 is characterized in that a steering force control valve 163 is provided with a plurality of orifices arranged in parallel with each other and successively or stepwise one by one opened in accordance with increases in the vehicle speed, in lieu of the variable orifice 154 of the steering pressure control valves shown in FIGS. 3 and 4. In this embodiment, two parallel passages 164 and 166 bypass a portion 168 of the passage 40 in parallel with each other. The passages 164, 166 and 168 are formed therein with orifices 170, 172 and 174, respectively. Control valves 176 and 178 are disposed in the passages 164 and 166 to close and open the passages 164 and 166 and include operating means 180 and 182 such as solenoids for operating the control valves 176 and 178, respectively. The operating means 180 causes the control valve 176 to close and open the passage 164 in response to a vehicle speed below and above a first predetermined value, respectively. The operating means 182 causes the control valve 178 to close and open the passage 166 in response to a vehicle speed below and above a predetermined value, respectively. Th second predetermined value differs from the first predetermined value. Sensing means (not shown) is provided for sensing the vehicle speed. Thus, the output fluid pressure $P_c$ in the passage 40 upstream of the orifices 170, 172 and 174 are stepwise reduced in accordance with increases in the vehicle speed. Accordingly, the steering force is stepwise increased with increases in the vehicle speed, as apparent from the Equation (6). The cross sectional areas of the orifices 170, 172 and 174 may be equal to or different from each other.

Figure 6:
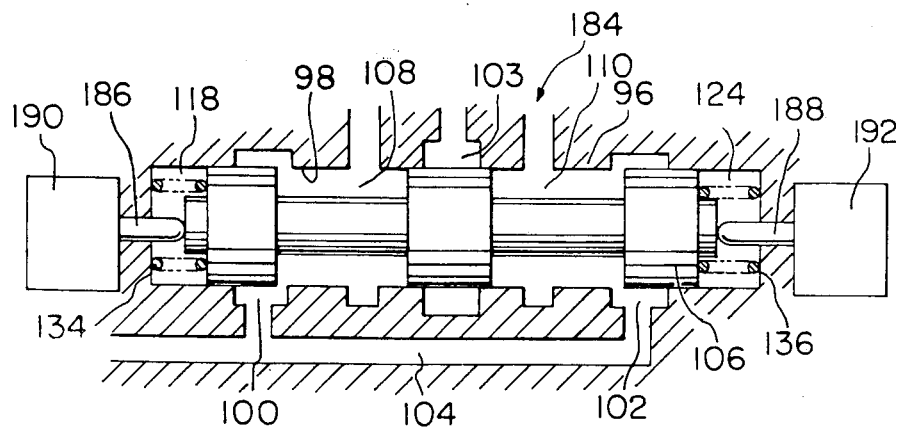
FIG. 6 is a schematic view of a sixth preferred embodiment of a steering force control system according to the invention.

The steering force control system shown in FIG. 6 is characterized in that a reaction force chamber control valve 184 is electromagnetically operated by plungers 186 and 188 controlled respectively by solenoids 190 and 192, in lieu of being operated by the hydraulic fluid pressure as the reaction chamber control valve 94 shown in FIG. 1. Each of the solenoids 190 and 192 includes a switch (not shown) which causes the corresponding solenoid to move and return the control valve 184 into the corresponding operative position and the neutral position in response to a hydraulic fluid pressure in the corresponding fluid chamber of the power cylinder 79 above and below a predetermined value, respectively.

It will be thus appreciated that the invention provides a simple and inexpensive steering force control system comprising a steering pressure control valve which regulates an input fluid pressure from a pump to a steering pressure either stepwise or continuously varied in accordance with the speed of a vehicle and a reaction chamber control valve by which, when a power cylinder control valve alternatively feeds the steering pressure into two working chambers of a power cylinder, the input fluid pressure is fed into only a reaction chamber of the power cylinder control valve, corresponding to the working chamber fed with the steering pressure, and produces a reaction force increased with increases in the vehicle speed so that the fatigue of the vehicle driver is reduced and the safety in the vehicle travel is increased.

What is claimed is:

1. A steering force control system for a power steering system of a vehicle, comprising
an input fluid pressure source;
pressure control valve means communicating with said source for regulating an input fluid pressure therefrom to a steering pressure;
second control valve means communicating with said pressure control valve means and with first and second fluid chambers of a power cylinder of the power steering system for controlling communication between said pressure control valve means and each of the first and second fluid chambers and for alternatively draining the first and second fluid chambers, said second control valve means having a first operative position for providing communication between said pressure control valve means and the first fluid chamber and for draining the second fluid chamber, and a second operative position for providing communication between said pressure control valve means and the second fluid chamber and for draining the first fluid chamber, said second control valve means being movable by a steering force between said first and second operative positions and having first and second reaction force chambers;

third control valve means communicating with said source and with said first and second reaction chambers for controlling communication between said source and each of said first and second reaction chambers and for alternatively draining said first and second reaction chambers, said third control valve means having a third operative position for providing communication between said source and said first reaction chamber and draining said second reaction chamber for imparting to said second control valve means a reaction force opposing a steering force necessary for moving said second control valve means into said first operative position, and a fourth operative position for providing communication between said source and said second reaction chamber and draining said first reaction chamber for imparting to said second control valve means a reaction force opposing a steering force necessary for moving said second control valve means into said second operative position; and operating means for moving said third control valve means into said third and fourth operative positions when said second control valve means is moved into said first and second operative positions, respectively.

2. A steering force control system as claimed in claim 1, in which said third control valve means comprises a housing defining a valve chamber communicating with said source and with said first and second reaction chambers and with a drain line, a valve spool slidably fitted in said valve chamber for controlling communication between each of said first and second reaction chambers and both said source and said drain line, said valve spool having said third operative position for providing communication between said source and said first reaction force chamber and between said second reaction force chamber and a drain line, and said fourth operative position, for providing communication between said source and said second reaction force chamber and between said first reaction force chamber and said drain line, said valve spool being movable into said third and fourth operative positions in response to movements of said second control valve means into said first and second operative positions, respectively; and first and second springs for urging said valve spool toward said fourth and third positions in opposite directions, respectively.

3. A steering force control system as claimed in claim 1, in which said pressure control valve means comprises means defining an orifice;

inlet passage means for conducting said input fluid pressure into said orifice;

a valve spool for varying the effective cross sectional area of said orifice to regulate said inlet fluid pressure to said steering pressure;

outlet passage means for conducting said steering pressure from said orifice; said valve spool having a land having a first land face communicating with said inlet passage means and on which said input fluid pressure acts to urge said valve spool in one direction increasing the effective cross sectional area of said orifice, and a second land face communicating with said outlet passage means and on which said steering pressure acts to urge said valve spool in an opposite direction reducing the effective cross sectional area of said orifice, bypass passage means providing communication between said inlet and outlet passage means; and a control valve for opening and closing said bypass passage means in response to a speed of the vehicle below and above a predetermined value.

4. A steering force control system as claimed in claim 3, in which the area of said first land face is smaller than that of said second land face.

5. A steering force control system as claimed in claim 3, in which the area of said first land face is equal to that of said second land face, and said pressure control valve means further comprises a spring acting on said second land face to urge said valve spool in said opposite direction.

6. A steering force control system as claimed in claim 1; in which said pressure control valve means comprises means defining an orifice;

inlet passage means for conducting said input fluid pressure into said orifice;

a valve spool for varying the effective cross sectional area of said orifice to regulate said inlet fluid pressure to said steering pressure;

outlet passage means for conducting said steering pressure from said orifice; said valve spool having a land having a first land face communicating with said inlet passage means and on which said input fluid pressure acts to urge said valve spool in one direction increasing the effective cross sectional area of said orifice, and a second land face communicating with said outlet passage means and on which said steering pressure acts to urge said valve spool in an opposite direction reducing the effective cross sectional area of said orifice, third passage means providing communication between said outlet passage means and said second land face, a drain line communicating with said third passage means and having an orifice formed therein, a variable orifice formed in said third passage means, and area control means for increasing the effective cross sectional area of said variable orifice in accordance with increases in the speed of the vehicle.

7. A steering force control system as claimed in claim 6, in which said pressure control valve means further comprises a plurality of passage means all of which bypass a portion of said third passage means, said variable orifice comprising a plurality of orifices found respectively in said plurality of passage means and an orifice formed in said portion of said third passage means, said area control means comprising a plurality of control valves for closing said plurality of passage means at speeds of the vehicle below a plurality of predetermined values, respectively which are different from each other and for opening said plurality of passage means at speeds of the vehicle above said plurality of predetermined values, respectively.

8. A steering force control system as claimed in claim 6, in which the area of said first land face is smaller than that of said second land face.

9. A steering force control system as claimed in claim 6, in which the area of said first land face is equal to that of said second land face, said pressure control valve means further comprising a spring acting on said second land face to urge said valve spool in said opposite direction.

10. A steering force control system as claimed in claim 1, in which said pressure control valve means includes, means for causing an increase in said input fluid pressure in accordance with said steering pressure and the speed of the vehicle.

11. A steering force control system as claimed in claim 1, in which said operating means comprises third and fourth fluid chambers each communicable with said pressure control valve means through said second control valve means for moving said third control valve means into said fourth and third operative positions by said steering pressure fed into said third and fourth fluid chambers respectively, and first and second biasing means for urging said third control valve means towards said fourth and third operative positions in opposite directions respectively, said second control valve means comprising means for providing communication between said pressure control valve means and said third fluid chamber and draining said fourth fluid chamber when said second control valve means is moved into said second operative position and for providing communication between said pressure control valve means and said fourth fluid chamber and draining said third fluid chamber when said second control valve means is moved into said first operative position.

12. A steering force control system as claimed in claim 1, in which said operating means comprises first and second plungers for moving said third control valve means into said fourth and third operative positions respectively, and first and second solenoids for causing said first and second plungers to move said third control valve means into said fourth and third operative positions in response to the pressure of fluid in said second and first fluid chambers above a predetermined value, respectively.

* * * * *